Patented Feb. 18, 1930

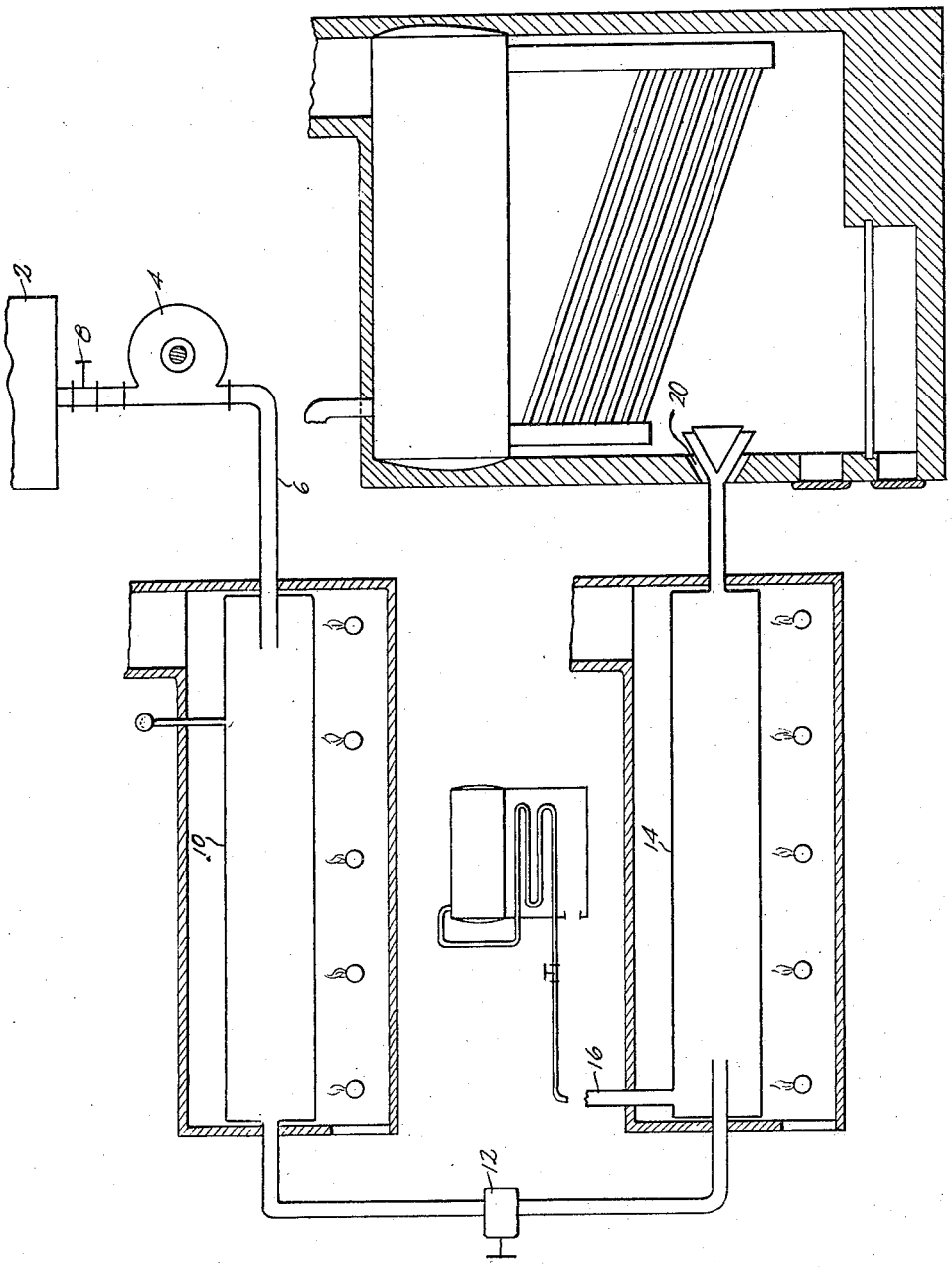

1,747,375

UNITED STATES PATENT OFFICE

ARLINGTON H. MALLERY, OF NEW YORK, N. Y., ASSIGNOR TO MALLERY PROCESS CORPORATION, OF NEW YORK, N. Y., A CORPORATION OF DELAWARE

METHOD OF UTILIZING RESIDUE OILS CONTAINING WATER

Application filed April 5, 1926. Serial No. 99,938.

The present invention relates to a method for the utilization of residue oils and more particularly to a method of utilizing residue oils containing water, or hydrocarbon oils, emulsions, or acid sludges, composed of hydrocarbon oils, water and acid and other materials.

In the production of gasoline from crude oils and other mineral oils, various oil residues are produced which are a source of great inconvenience and loss to the refiner, for the reason that no economical way has been devised for disposing of the residues and it has been the practice to store such residues by allowing them to accumulate in a pond or excavated hole. The acid sludges obtained by treating the distilled products from the mineral oil with acid, so as to remove unsaturated carbons and other impurities, are particularly obnoxious on account of the odor and the tendency of forming emulsions which are almost impossible to break up. After the treatment of the various oil fractions with acid, fractions are generally washed with water to remove remaining amounts of acid and a part of these washings are generally added to the acid sludge.

Many attempts have been made to devise a method by which the emulsions may be broken up so as to recover the oil therein, but such processes have been found to be costly and, for certain refractory emulsions, have been found to be wholly inoperative.

As a result of a large number of experiments, I have discovered a method by which oil residues containing water may be utilized and which is applicable to all grades of emulsions of oil and water up to substantially 80% of water. The method is, in fact, applicable to emulsions containing even higher percentages of water, although it is doubtful whether oil emulsions containing such higher percentages of water may be economically treated. It is to be understood, however, that my method is applicable to the treatment of all such emulsions. Furthermore, the method is particularly adapted for the treatment of acid sludge and is of particular advantage in this connection for the reason that the sulphuric acid, employed for washing mineral oils, through which the acid sludge is obtained, may be recovered and utilized again for the treatment of oil fractions or for any other suitable purpose.

The primary object of the invention is to provide a method by which fluid fuels containing water may be utilized and disposed of with profit.

Another object of the invention is to provide a method for burning combustible material containing water in any proportion.

Another object of the invention is to provide a method for the utilization of acid sludges in a manner so as to permit recovery of the acid contained therein.

Another object of the invention is to provide a method by means of which mixtures of oil residues and acid sludges may be utilized to obtain the heat value from the oil therein and to recover one or more valuable constituents as by-products.

A further object of the invention is to provide a method by means of which B. S., roily oil or heavy oil residues, mixed with acid sludge, or oil emulsions, may be burned to recover the heat values of the hydrocarbons contained therein, and whereby one or more of the inorganic constituents of the mixture may be recovered.

With these and other objects in view, the invention comprises the various features hereinafter more fully described and defined in the claims.

In carrying out the process of my invention as applied to oil residues or other oil containing water, I preferably heat material to such a temperature that the water is vaporized and the resultant steam may be superheated. This may be accomplished in any suitable form of apparatus, such as a pipe coil, heated either by waste gases or by an oil burner or in any other suitable way. I preferably heat the mixture under treatment to a temperature of approximately 1250° F., although any temperature may be employed whereby when air is passed to the burning mixture, the resulting temperature will be at or above the kindling temperature of the oil in the resulting mixture. I find that as a practical lower limit the temperature should be at least 900° F., but the temperature of the mixture may even exceed 1250° F., and temperatures as high as 2000° F. may be satisfactorily employed in some cases.

At this stage of the process, before air has been mixed with the gases, the oil in the mixture becomes more or less cracked, whereby a large amount of heat is absorbed, the operation of cracking being an endothermic reaction. I may now pass the resulting gases directly into contact with air supplied in amounts sufficient to cause substantially complete combustion of the oil in the mixture. The amount of air supplied should be regulated so as not to supply substantially more than is needed for complete combustion, because of the consequent loss of heat due to the heating of inert gases not used in the reaction. By passing the gases into contact with a body to be heated, such as a steam boiler, for example, the heat is abstracted from the gases, and by regulating the amounts of materials used the combustion of the oil in the residue employed is accomplished without waste of heat.

It is obvious that by this process the only loss of heat involved in the operation over the usual method employed for the burning of fuel oils, which contain no water, is that represented by the amount of heat necessary to vaporize the water present in the oil which is used, plus the heat required to raise the temperature of the water from that of the residue oil mixture to a vaporizing temperature, and in addition the heat absorbed by the steam, which is formed from the water, in raising its temperature up to that of the gases leaving the stack. By this process, oils containing water up to 80% may be utilized in the manner described, the amount of heat lost by the vaporization and heating of the water present in the residue or oil mixture is relatively small, and is compensated for by the heat obtained from the combustion of the oil in the residue or oil mixture. By this process, oils which have heretofore been considered a total loss to the refiner may be satisfactorily utilized.

While the above method is suitable for the treatment of all oils containing water, I have found that the vaporization of the oil and the water sometimes causes more or less pounding or knocking, and by the use of the method hereinafter described the so-called "explosions" or knocking may be substantially eliminated. This knocking or pounding in the apparatus is due apparently to water globules present in the oil mixture or emulsion which are coated or surrounded by a film of oil which prevents the vaporization of the water until the temperature has become so high that the vapor tension of the water finally breaks the oil film, and the water then flashes into steam, causing the knocking sound or "explosion." The severity of the "explosions" or bursting of water globules into steam varies greatly with different types of oils.

In cases in which oil emulsions are to be treated which cause unusually violent explosions, or in cases in which the oil mixture to be employed is more adapted to be treated by my modified process, I may proceed as follows:

I preferably pass the oil emulsion or mixture of oil and water into contact with highly superheated steam, whereby the oil water mixture or emulsion becomes distributed through the superheated steam, and becomes heated in such a manner as to reduce or substantially avoid the cracking sound or knocking during the vaporization of the water in the oil. The reason for the elimination of the "explosions" by this mode of heating is not entirely understood, but it is possible that the blanket of superheated steam, into which the oil mixure is passed, serves as a cushioning medium during the time that the water globules become vaporized, or it may be that the surface tension of the oil around the water globules is reduced so that the "explosion" or flashing of the water into steam is substantially eliminated. It is to be understood that in the use of this modified method I may pass the oil mixture at ordinary temperatures, or preheated into contact with the superheated steam, or I may first vaporize the oil and the water mixture and thereafter pass superheated steam into contact with the vaporized oil and water so as to attain a final temperature of the mixture above 900° F., or preferably in the neighborhood of 1250° F., so that when air is passed into contact with the oil vapors and the vapors have been ignited, the temperature of combustion will be maintained above the kindling temperature. By the above methods the oil residues containing water, or oil emulsions or mixtures containing water may be continuously treated, whereby the various oil residues at a refinery may be continuously disposed of, utilizing the heat generated from the residues for the distillation of oil, or for the generation of power as may be required.

The oil mixtures or emulsions may be passed either in a continuous stream through the apparatus or may be fed intermittently therethrough. I may, for example, pass the heated oil and vaporized water intermittently, by means of a suitable valve, into a body of superheated steam, the oil and water vapors being preferably passed or injected by means of a valve mechanism operating several times a second so that the operation becomes substantially continuous.

A specific example of the mode of carrying out my invention is described in connection with the accompanying drawing, in which:

The figure represents diagrammatically an apparatus for carrying out the invention.

Referring more particularly to the drawings, the numeral 2 designates a residue tank containing oil emulsion, or other liquid fuel containing water suspended in or otherwise admixed therewith. From the tank 2, the oil-water mixture is pumped by means of a pump 4 through a pipe 6, having a valve 8 therein for controlling the flow of the mixture and is passed into a pipe coil 10 or retort, which is heated by waste heat or by direct heat from any suitable source, the temperature of the retort or coil being preferably maintained at about 1000° F. and the pressure therein being preferably maintained at substantially 100 lbs., although both the temperature and pressure may be varied considerably as hereinbefore described. In the retort 10, the oil and water are vaporized and superheated whereby more or less cracking of the oil takes place, and probably more or less interaction takes place between the steam and the oil vapors formed. The products are heated in passing through the retort so that at the time they leave the retort or coil they are at a temperature of substantially 1000° F. From the retort 10 the products formed therein are passed through a reducing valve 12 of any suitable form so that the pressure drops to substantially 10 lbs. in the conduit 14 to which they are passed. I have operated with pressures in the neighborhood also of 2 lbs. and 5 lbs. per square inch in the chamber or conduit 14 by means of which satisfactory operation was obtained. As the products pass through the reducing valve 12, a fall in temperature occurs through expansion and I preferably heat the conduit or chamber 14 to about 1250° F. so as to supply heat to the products so as to maintain the temperature of the products above the kindling temperature, whereby when the products are burned with air the temperature necessary for combustion will be maintained. The passage of the products into the conduit 14 may be continuous or intermittent as desired. In the chamber 14. I preferably supply superheated steam at about 1250° F., by means of the pipe 16, having a valve 18 therein which serves to regulate the supply of the steam. From the chamber 14 the mixture of gases and vapor is passed to the combustion chamber to which air is admitted through openings 20. The amount of air for obtaining the proper combustion may be regulated in any well known way.

In the treatment of oil mixtures carrying large quantities of water, I may add or mix therewith, if desired, other oil residues, such as fuel oil, in order to maintain substantially uniform conditions of operation or to increase the economy of the process.

I have found that my method is particularly adaptable for the treatment of acid sludges such as are obtained by the washing or treatment of various fractions of oil by means of sulphuric acid. The sulphuric acid compounds which are formed with unsaturated hydrocarbons in the treatment of the oil fractions, comprise sulphonates, which are soluble in water and may thus be washed out of the oil, the various oils, such as gasoline, kerosene or lubricating oils, being as is well-known, insoluble in water. In the treatment of the various oil fractions with sulphuric acid, more or less of the saturated hydrocarbons become emulsified in the acid sludge and a small amount are thus removed with the sludge.

I preferably treat the sludge by one of the methods of treatment described above in connection with the treatment of residue oils containing water. If the oil sludge contains a large proportion of sulphuric acid, I may, if desired, omit the abstracting of the heat from the gases when combustion takes place and, instead of passing the gases into contact with the steam boiler or other body to be heated, I may cool the gases directly by means of a condenser or other cooling means by which the water present in the gases, formed by the union of oxygen of the air with the combined hydrogen of the oil during combustion and also that which was originally present in the sludge, is separated out. Through the combustion of the oil, inert gases are formed, and the sulphur trioxide, and any sulphur dioxide formed in the reaction, will be absorbed in the water present when the gases are passed through the condenser. The gases may, if desired, be passed into contact with water from an outside source to absorb any remaining sulphur trioxide or sulphur dioxide in the gases issuing from the condenser. It is to be understood that I preferably abstract the heat from the gases by passing the gases into contact with a steam boiler or other body by means of which the heat in the gases may be utilized before abstracting sulphur trioxide for the recovery of the sulphuric acid originally in the sludge.

Certain oil sludges which do not contain acid, particularly those obtained by washing mineral oil fractions with alkali, may also be treated in the manner above described, utilizing the heat of combustion of the oil in the sludge by heating a boiler or still, or other device by means of which the heat is abstracted, but in this case the gases are permitted to escape into the atmosphere after the heat is abstracted therefrom.

In a modification of my process, I may produce an oil gas, which is obtained by the incomplete combustion of residue oils containing water. The process which I preferably employ comprises heating the oil and water under pressure at a temperature sufficient to change the water in the mixture to superheated steam and supplying an amount of heat so that the temperature of the mixture may be maintained substantially above 900° F. or above the kindling temperature of the oil in the mixture and then admitting air to the oil in amounts insufficient for complete combustion, and preferably at such a rate as to form substantially all carbon monoxide and little or no carbon dioxide from the combined carbon of the oil. If desired, heat may be abstracted from the gases, resulting from the partial combustion, and the gases may then pass to storage gas tanks or other storage means until required for use.

It is to be understood that I may employ any suitable apparatus for carrying out my process or processes and that various changes or modifications may be made in the various stages of the process without departing from the spirit or scope of the invention as defined in the claims. It is to be understood also that my process is applicable not only to residue oils or oil fractions mixed with water, but it is equally applicable to crude oils containing water or emulsions thereof, and may be used for mineral oils or combustible materials in general admixed with water. It may be employed for the disposal of sewage sludge containing water, or in connection with residue tannin liquors, or for animal or vegetable oil emulsions, or fish waste material and in connection with the numerous waste products of various industries in which liquors containing combustible material which must be disposed of to prevent pollution of streams and for reasons of sanitation. I do not desire therefore to limit the scope of my invention execpt as hereinafter defined in the claims.

Having thus described the invention, what is claimed as new is:

1. A method of utilizing emulsions containing combustible material and water, which consists in confining the emulsion, preliminarily imparting to the emulsion in its confined state such a quantity of heat as will vaporize so much of the water content as is necessary to render the combustible material readily burnable in the presence of air, and burning such material.

2. A method for utilizing residue oils containing water, which comprises subjecting the oil and water to pressure, imparting to the oil and water while under pressure such a quantity of heat as will cause the water to be changed to superheated steam, passing air thereto in sufficient amount to attain substantially complete combustion of the oil, and burning the oil.

3. A method for utilizing acid sludge containing combustible material, which comprises subjecting the sludge to pressure, imparting to the sludge while under pressure such a quantity of heat as will vaporize the water present, furnishing sufficient heat to maintain the temperature above the kindling temperature of the combustible material in the mixture, and supplying air in sufficient amount to attain substantially complete combustion of the said material therein.

4. A method of utilizing emulsions containing combustible material and water, which consists in confining the emulsion, preliminarily imparting to the emulsion in its confined state such a quantity of heat as will change the water to steam, the amount of heat supplied depending upon the amount of water present and the calorific value of the combustible material, and thereafter burning the material in the presence of air.

5. A method for utilizing residue oils containing water, which comprises subjecting the oil and water to pressure, imparting to the oil and water mixture while under pressure such a quantity of heat as will change the water to superheated steam, thereafter passing superheated steam into the mixture at a temperature sufficient to raise the temperature of the mixture to the ignition temperature of the oil, and burning the mixture.

6. A method of utilizing emulsions containing water and combustible material, which consists in confining the emulsion, preliminarily heating the emulsion in its confined state so as to supply sufficient heat to render the emulsion combustible, raising the resultant products to the kindling point of the combustible material and thereafter burning the same in the presence of air.

Signed at New York, New York, this 1st day of April, 1926.

ARLINGTON H. MALLERY.